Sept. 13, 1938.   J. J. GORDON ET AL   2,129,684
PROCESS AND APPARATUS FOR REMOVING WATER FROM AQUEOUS ALIPHATIC ACIDS
Filed Sept. 15, 1934   4 Sheets-Sheet 1

Sept. 13, 1938.                J. J. GORDON ET AL                  2,129,684
   PROCESS AND APPARATUS FOR REMOVING WATER FROM AQUEOUS ALIPHATIC ACIDS
                        Filed Sept. 15, 1934        4 Sheets-Sheet 3

1  AQUEOUS ACETIC ACID STORAGE
2  FEED TANK
3  SOLVENT STORAGE
4  FEED TANK
5  NO.1 EXTRACTOR
6  NO.2 EXTRACTOR
7  NO.39 EXTRACTOR
8  NO.40 EXTRACTOR
9  EXTRACT STORAGE
10 FEED TANK
11 EXTRACT VAPORIZER
12 RECTIFYING COLUMN
13 CONDENSER
14 REFLUX CONDENSER
15 SEPERATOR
16 STILL POT
17 CONDENSER
18 ACID RECEIVER
19 ACID RECEIVER

Inventors:
Jack J. Gordon &
Frederick P. Conklin,
By
Attorneys

Patented Sept. 13, 1938

UNITED STATES PATENT OFFICE

2,129,684

PROCESS AND APPARATUS FOR REMOVING WATER FROM AQUEOUS ALIPHATIC ACIDS

Jack J. Gordon and Frederick R. Conklin, Kingsport, Tenn., assignors, by mesne assignments, to Eastman Kodak Company, Jersey City, N. J., a corporation of New Jersey Application September 15, 1934, Serial No. 744,251

29 Claims. (Cl. 260—122)

This invention relates to processes of removing water from aqueous aliphatic acids and more particularly to processes for the dehydration of dilute aqueous solutions of acetic, propionic, and other aliphatic acids or mixtures thereof by extraction and distillation employing as dehydrating agents esters of an aliphatic acid and an aliphatic alcohol, associated with an aliphatic alcohol, the ester having from five to six carbon atoms and the alcohol from three to four carbon atoms.

The complete or partial dehydration of aqueous aliphatic acids or mixtures thereof is a problem of great technical importance. For example, certain processes, such as the manufacture of cellulose acetate or other cellulosic materials, require large quantities of concentrated or anhydrous acids, and after the processes are completed, there is generally left a great amount of dilute acid which must be dehydrated before the acid can be reutilized. There are various other sources of dilute acid, as, for example, the acid liquid, together with various impurities, obtained by the destructive distillation of wood, which is called pyroligneous liquor. After separating out the impurities the solution must be concentrated to recover the desired acids.

Likewise, when acids are produced by the action of micro-organisms, they are obtained in the dilute state and therefore must be concentrated in order to obtain the desired commercial product. It is, therefore, apparent that to lessen the expense of dehydration without the sacrifice of efficiency is a highly desirable result.

Various processes for the concentration or dehydration of aliphatic acids have been devised, among which may be mentioned processes employing extracting agents, such as ethyl or propyl acetates. It has also been proposed to extract dilute acids with ethyl acetate, ethyl butyrate, or iso-propyl acetate, after which the extract is further treated with an alcohol for the purpose of producing more ester. The resulting mixture is finally distilled to vaporize off the ester and water as an azeotropic mixture. There are also known, as an azeotropic mixture. There are also known, processes in which the dilute acid is converted to ester after which the concentrated acid is recovered from the ester. Such processes, however, are rather complicated.

While the use of such agents as propyl acetate are superior to other agents of the prior art, particularly from the heat economy standpoint, unless these agents are used in certain ways, some technical difficulties may arise. As, for example, in the case where propyl acetate is used in dehydrating acetic acid by extraction and an excess of propyl acetate remains in the anhydrous acid, because the boiling point of propyl acetate is quite close to that of acetic acid, it is very difficult and expensive to separate this excess.

We have developed a group of new agents for dehydrating dilute aliphatic acids, which have been proved to be superior in many respects to any heretofore known, together with new continuous processes for utilizing these agents.

This invention has as an object to provide a process of removing water from dilute solutions of acetic, propionic, and other aliphatic acids or mixtures thereof. A further object is to provide a process which is applicable not only to relatively pure water solutions of acetic, propionic, and other acids, but also to the production of dehydrated acid from crude aqueous solutions, such as pyroligneous liquor. A still further object is to provide a process for the concentration of aqueous solutions of acetic acid mixed with varying proportions of other aliphatic acids. Another object is to provide a process in which the water removed carries with it to waste only a very small amount of acid. A further object is to provide a process in which extraction and distillation are the main factors. It is also an object to provide a process which will be simple, inexpensive, and yet applicable to solutions of any strength. Another object is to provide a dehydrating agent that removes more water per unit of agent than others which allow operable temperatures with aliphatic acids. Still another object is to provide a process in which the amount of heat required is kept to a low value. It is also an object to provide a process of concentrating aqueous aliphatic acids which is continuous. Another object is to employ the agent in such a manner that the finally dehydrated acid is not materially contaminated with the dehydrating agent. A still further object is to circulate the dehydrating agent in such a manner that its composition may be regulated. Another object is to provide a process for the partial concentration of acetic, propionic or other fatty acids or mixtures thereof from their aqueous solutions. It is also an object to provide a process in which the same medium may be used both as an extracting agent and a water withdrawing agent. Other objects will appear hereinafter.

These objects are accomplished by the following invention which comprises primarily an extraction and distillation process for removing water from aqueous aliphatic acids in which an agent possessing both extracting and water entraining properties is employed. According to the following which is the preferred embodiment of our invention we have found that highly desirable results may be obtained by extracting the aqueous acid or acid mixture with an agent comprising normal-propyl acetate and normal-propyl alcohol, separating the extract from the watery layer, and then distilling water and agent from the extract mixture at a temperature below the boiling point of the acid or acids in question and also below the boiling point of water. It is important to note that our preferred extracting agent, does not fall in the class of extremely low boiling-point compounds already known as ethyl acetate. Our preferred agent falls generally in a class of agents which boil above the low boiling point solvents but below the boiling point of acetic acid and form minimum boiling mixtures with water but not with acetic acid.

Our processes may be carried out in extraction apparatus and fractionating columns of a known type, arranged in various ways. It is to be noted, however, that we prefer to use the apparatus and the plant layout disclosed in the accompanying drawings. These things are described fully hereinafter and it is to be understood that our processes and apparatus, although explained with reference to propyl acetate-propyl alcohol, are applicable to the other agents embraced by the application.

In the preferred embodiment of our process, the normal-propyl acetate-n-propyl alcohol passes through a cycle without serious loss and can be re-used in a continuous manner. We have found that this new agent comprising normal-propyl acetate and normal-propyl alcohol possesses all the requisites of an organic material for use in the dehydration of a dilute aliphatic acid by extraction and distillation. It is suitable not only when used in the concentration of acetic acid, but also in the concentration of higher aliphatic acids, such as propionic. One form of our new agent comprises as a major constituent, normal-propyl acetate which is a compound with the formula $C_5H_{10}O_2$, a molecular weight of 102.1, density of .891, boiling point of 102° C., and as a minor constituent: normal-propyl alcohol, sometimes referred to as n-propyl alcohol or propanol-1. This other constituent is a colorless liquid having the following formula: $CH_3CH_2CH_2OH$, a density of .799, and a boiling point of 97° C.

Other compounds which do not detrimentally affect the agent in its use for dehydrating may, of course, be present in small amounts, and the claims are to be construed as covering any such diluent materials and the use of n-propyl acetate and n-propyl alcohol or other agent either in the chemically pure or commercially obtainable condition. Further details concerning our preferred dehydrating agent and its use may be observed from a consideration of the following:

In the accompanying drawings in which like reference characters refer to like parts.

In Figures 1 to 4 inclusive, the following terms have the following meanings:

$C_s$ represents the concentration of acid in the solvent layer.

$C_w$ represents the concentration of acid in the watery layer.

PrOH represents n-propyl alcohol.

HOAc represents acetic acid.

$H_2O$ represents water.

The term solvent is used substantially interchangeably with the term agent in this specification.

K represents the ratio between $C_s/C_w$ and is a well known term in physical chemistry.

Figures 5, 6:
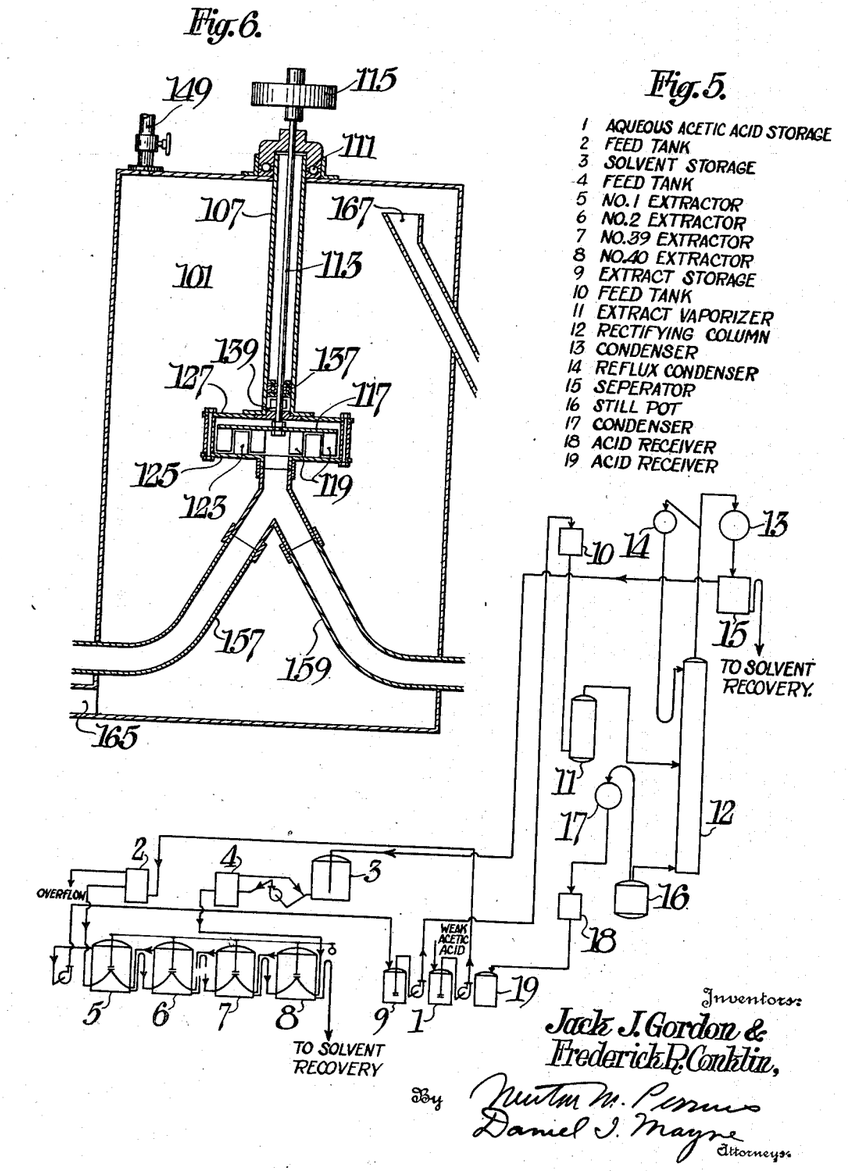
Fig. 5 is a diagrammatic side elevation of a plant layout of apparatus for practicing our new process.
Fig. 6 is a semi-diagrammatic side elevation on a larger scale of a suitable extractor unit represented in Fig. 5 at 5, 6, 7 or 8, for example, certain parts being shown in exaggerated scale and other parts being shown on section for clarity.

The legend accompanying Fig. 5 is self explanatory.

The values represented by or obtained from the curves or set forth at other points herein are accurate within a reasonable range allowed for experimental error. In some instances values have been expressed to the nearest whole number.

Figure 1:
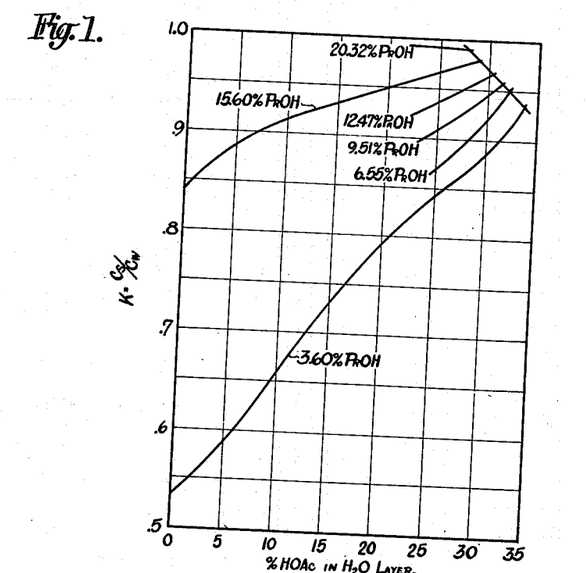
Fig. 1 is a graph representing a relationship between the distribution constant K and the acid concentration of the water layer for certain alcohol contents.

In Fig. 1, which shows the distribution coefficient K plotted against the acid concentration of the water layer for mixtures from about 3.60% n-propyl alcohol to 20.32% n-propyl alcohol in n-propyl acetate, it is to be noted that the ratio increases rapidly with increasing alcohol content of the solvent.

Figure 2:
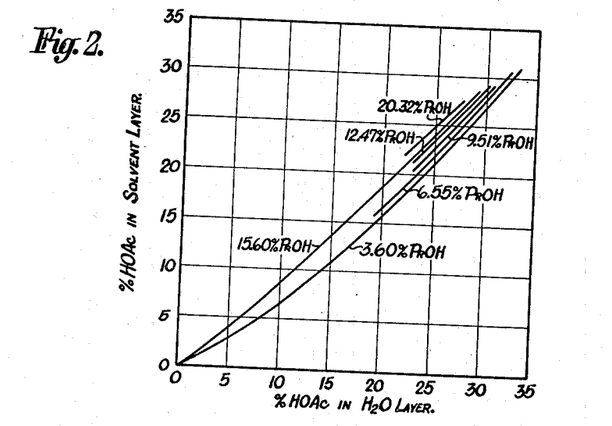
Fig. 2 is a graph representing a relationship between the acid concentration in the solvent layer and the acid concentration in the water layer.

From Fig. 2, which shows the acid concentration in the solvent layer plotted against the acid concentration in the watery layer when employing our preferred agent, namely n-propyl acetate-n-propyl alcohol, it is apparent the alcohol improves the agent.

Figure 3:
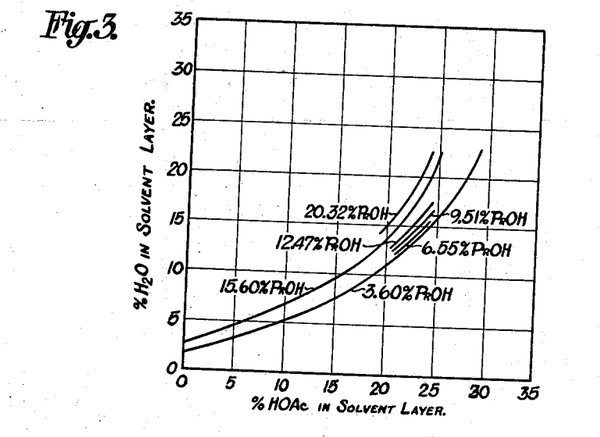
Fig. 3 is a graph representing a relationship between the water in the final extract and the acid in the extract.

From Fig. 3 it may be seen that there is a decided favoring of a water content by the solvents richest in alcohol. This is an important factor in controlling the amount of water relative to the amount of solvent in order to insure the presence of enough, and preferably more than enough water in the distilling column, to remove all of the solvent as an azeotrope.

Figure 4:
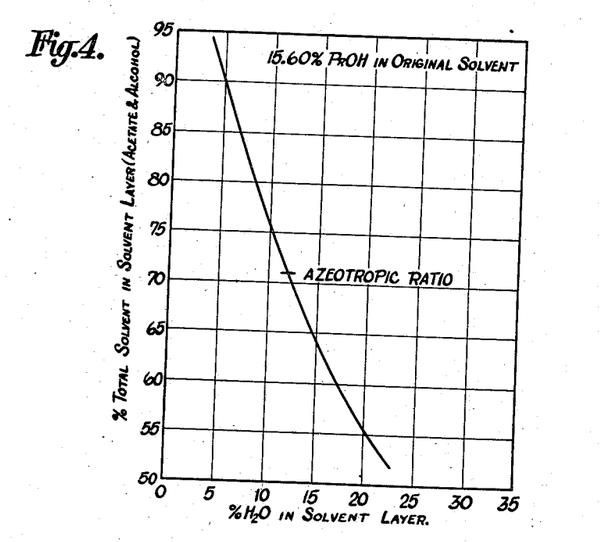
Fig. 4 is a plot of the total agent against the total water in the extract for the particular composition n-propyl alcohol about 15.6%, n-propyl acetate about 84.40%.

Fig. 4 represents a specific acetate-alcohol solvent and indicates its azeotropic ratio.

The use of our preferred type of solvent described above allows dehydration processes to be carried on at lower temperatures than are possible with any other group of solvents except the prior art low boiling class. In fact, the temperatures are practically no higher than those necessary with the low boiling solvents. However, our new class of solvents is more easily handled than the low boiling solvents on account of their lower evaporation rates. Also, they take a smaller amount of water into solution than the low boiling solvents which are good solvents for acetic acid. At the same time they have a much more favorable distribution ratio than higher boiling point solvents.

It is possible to obtain a better solvent by mixing two liquids one of which is soluble in water but is distributed well to the solvent side in the equilibrium, water-A-solvent, where A represents the mutually soluble substance. In this way the distribution ratio for a fourth component, an aliphatic acid, may be increased greatly. Also, the solvent composition may be so regulated as to control the water content of the final extract. These facts are supported by the various curves shown on the drawings discussed above.

While the graphs show alcohol contents of from about 3% to 21% and while we generally use a major proportion of normal-propyl acetate and a minor proportion of normal-propyl alcohol when employing our preferred agent, we do not wish to be limited to the exact values disclosed, since they have been given by way of illustration only, and the proportions of alcohol and normal-propyl acetate may be varied. In general, however, we prefer to use somewhere from a small amount of normal-propyl alcohol, in the neighborhood of 3 to around 25%, and the balance substantially all normal-propyl acetate.

The advantage of using this mixed agent of normal-propyl acetate and normal-propyl alcohol over a one-component agent is further evident from the following comparison relating to the distillation step of our process.

| Agent | Azeotrope composition | B. P. of azeotrope |
| --- | --- | --- |
| | | Degrees |
| Propylene chloride | 88% propylene chloride 12% water | 78 |
| n-Propyl acetate | 86% n-propyl acetate 14% water | 82.4 |
| n-Propyl acetate n-Propyl alcohol | 59½% n-propyl acetate 19½% n-propyl alcohol 21% water | 82.2 |

It will be noted that the normal-propyl acetate-normal-propyl alcohol mixture of this invention carries over the largest amount of water. This is very important, since it may readily be seen that the amount of water taken over is much greater than that taken over by any of the agents heretofore known. Furthermore, this large amount of water is taken over at a temperature slightly lower than that required by propyl acetate, for example. The mixture which will distill from a mixture containing these three constitutents will then be of the above composition until all or one of the components is distilled off, since that particular ternary mixture distills at the lowest temperature. It is, therefore, evident that since this mixture contains an amount of water greater than that in the binary normal-propyl acetate-water mixture, there will be an increasing amount of water in the distillate as the alcohol content of the dehydrating agent increases.

In general, then, we prefer to use a sufficient amount of alcohol in the n-propyl acetate-n-propyl alcohol mixture used for extracting so as to give an extract which, when distilled, will carry over as large an amount of water as possible. It is clear, however, that advantages can be obtained by using other quantities of alcohol, hence we do not wish to be limited to any exact amount.

When using a plant layout as shown in Figure 5 including extractor units and fractionating columns, there is, from the practical standpoint, substantially no acid lost in the concentration of any of the aliphatic acids or mixtures thereof. Since our process, when carried out in the proper apparatus and with the proper technique, causes substantially no acid losses the process may be employed to concentrate aqueous acetic or propionic acid from any strength to the anhydrous condition. By increasing the number of extractors and varying the length of the fractionating column, the efficiency of the process can be still further increased. It will, of course, be apparent that, when concentrating a mixture of acids as, for example, acetic and propionic, there might be lost in the various watery layers minute amounts of both acids, but, from the practical standpoint, any such losses are negligible.

Any of the usual types of apparatus may be used in carrying out our dehydration process. However, we prefer to use the form of apparatus disclosed in the drawings forming a part of the present application.

Fig. 5 may be understood to a large extent merely by reference to the legend appearing thereon. However further consideration of Fig. 5 will be had under the description hereinafter concerning our new extraction-distillation process employing propyl acetate-propyl alcohol. This agent is described merely for the purpose of illustration and the use of our processes and apparatus is not to be construed as limited thereto.

In Fig. 6, the numeral 101 represents a tank or container, provided with a pressure vent outlet 149. Located approximately centrally of the tank 101 is a vertically extending casing 107. This casing 107 houses a shaft 113 which extends axially of the casing and has fixed to its upper end a pulley 115 to which power may be supplied. Fixed to the lower end of shaft 113 is an agitator arm or disk 117 which carries downwardly extending blade or blades 119. For coacting with the portion of the agitator described above, is another group or row of blades 123. All of these blades are positioned between two horizontally extending baffle plates 125 and 127. Beneath the lower baffle plate and connecting it with the side walls of the tank are a plurality of pipes 157 and 159. An outlet pipe 165 and an overflow pipe 167 are also provided. The extractor also includes bearing means 111 and 137 and packing means 139.

This new extractor forms the subject matter of copending application No. 751,843 of November 7, 1934, by J. J. Gordon and J. H. Zeigler.

Figure 7:
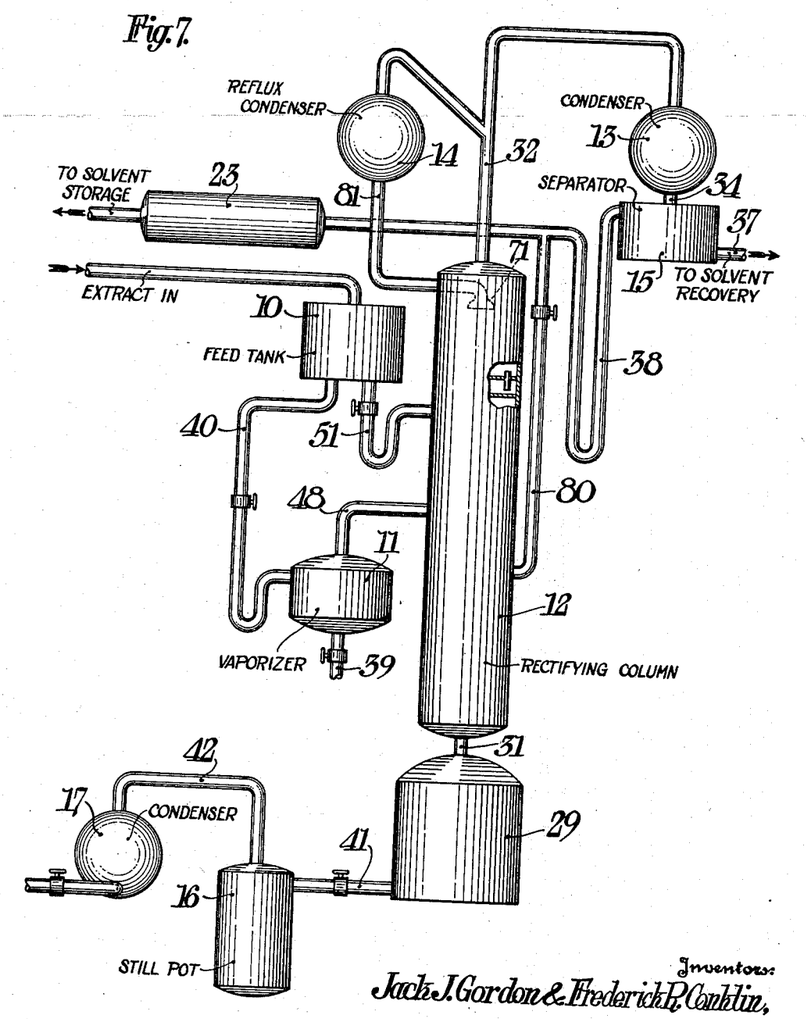
Fig. 7 is the same type of view as Fig. 6 of another piece of apparatus represented in Fig. 5, namely, the distillation unit and associated parts.

In Fig. 7 the numeral 12 represents a rectifying column. A portion of the column is broken away to show the internal construction of the column in diagrammatic form. For carrying out our process, we have found a column of approximately 52 plates construction to be suitable, although, of course, other size columns may be used, and, in fact, we have investigated columns containing 33 plates. However, the longer column is preferred, since it gives more efficient rectification.

At the bottom of the column there is provided a still pot 29 of the usual construction. It may be heated by steam pipes or other well-known means and, if necessary, heat may be applied to points in the column 12. The still pot 29 is connected with the column by a pipe 31 for the purpose of conducting vapors rising from the still pot into the column 12. The still pot 29 is provided with a pipe 41 by means of which the partially or in some instances completely dehydrated acid may be withdrawn to another container.

Still pot 16 represents an auxiliary container. The acid may be further treated in this still pot to remove any small amounts of impurities present. Acid vapors are conducted from container 16 by means of conduit 42 which is connected with condenser 17. Both of these parts might be dispensed with, or still pot 16 might be dispensed with by connecting conduit 42 directly with the upper part of still pot 29.

At a point intermediate of the column is provided a valved inlet pipe 51 for the introduction into the coumn of extract from the extract feed tank 10. This feed tank is mounted preferably above the inlet pipe in order that the extract will flow into the column by means of gravity. In the top portion of column 12 is provided an inlet 71 for spraying in dehydrating agent from the reflux condenser 14, pipe 81 connected with the inlet 71 being provided for conducting the refluxed agent thereto.

At the head of the column 12 is provided a vapor outlet pipe 32 connected with the condenser 13 which may be cooled with any suitable medium, as by circulating water. That the condensers are suitably cooled is to be understood as to all the condensers shown on the drawings. Any condensate accumulating in the condenser 13 is conducted by means of a pipe 34 into the separator 15. The pipe 37 carries away the water which separates out to waste or to solvent recovery as preferred. The pipe 38 ultimately conducts the solvent, which also separates out, back to solvent storage for re-use in the extractors. Somewhere along this return pipe, or at any other suitable point in the entrainer cycle, may be inserted a hydrolyzing or esterifying unit 23 for controlling the composition of the dehydrating agent.

In lieu of or supplemental to an esterifying unit, a portion of the separated agent may be returned to a point in the lower part of column 12 through the vertically extending valved conduit designated 80. By this means the composition of the acetate-alcohol agent will be controlled. That is, the agent in its passage through the system may have become hydrolyzed to some extent, hence it may have a higher alcohol content than desired. Bringing this agent in contact, at the lower part of the column, with relatively strong acid at an elevated temperature causes partial esterification of the alcohol content of the agent and thereby increases the ester content.

A pipe similar to 80 or in place thereof might be located on the opposite side of the column and connected with either pipe 38 or 81 for the purpose of conducting hydrolyzed agent to a lower point in the column.

This feature of returning a portion of the acetate alcohol to the lower part of the column for the purpose of altering and controlling its composition is to be distinguished from process of the prior art where a portion of a one component agent has been returned to a lower point in the column merely in order to obtain a better mixing with the acid being concentrated.

The composition of the agent may also be controlled by adding or withdrawing one or both components from the system, and it is to be understood that suitable openings, supply tanks, etc., may be provided at any point in the system for introducing ester, alcohol, and the like, if necessary, to control the composition of the agent.

At a point intermediate the column 12 is provided a vapor inlet 48 which connects the extract vaporizer 11 with column 12. A valved pipe line 40 is provided to conduct the extract from the feed tank 10 to the vaporizer 11. The vaporizer 11 may be of usual construction and may be provided with an outlet 39 for withdrawing therefrom any residual impurities as may collect therein.

The following example is an illustration of our preferred process, reference being made in particular to Fig. 5 of the drawings for an understanding thereof. At the outset, it is to be understood that in the following description of our process, the specific values, specific materials and the like set forth therein are merely for the purpose of illustration and not to be construed as limiting the invention excepting as to those values incorporated in the appended claims.

Thirty percent aqueous acetic acid is pumped from the storage tank 1 to the feed tank 2 from which it is metered into extractor 5 the first of a series of 20 to 40 extractors. These may be counter current extractors of a usual type, but it is preferred to use the type of extractor shown in Fig. 6. At the same time the dilute acid is being fed in, a mixture of n-propyl acetate and n-propyl alcohol containing a small amount of water is metered into the extractor designated 8 which is the last of the series of extractors.

The space between the extractors 6 and 7 has been shown in broken section to indicate that not all of the extractors have been shown on the drawings.

In the event the preferred extractor unit is employed, streams of the solvent will contact streams of the aqueous acid, and the resulting mixtures will be subjected to a plurality of agitators driven at substantially uniform speed. The agitated liquids will be thrown laterally from the agitator, after which the mixtures settle. The upper solvent layers pass to adjacent extractors and the lower watery layers also pass to other extractors.

It is to be noted that in using a battery of extractors or homogenizers of the type disclosed in Fig. 6, the fresh solvent contacts a substantially completely extracted liquid, and that the fresh incoming aqueous acid is treated with a nearly saturated solvent. At intermediate points in the series of extractors, partially saturated solvent contacts partially extracted streams of the acid containing liquid.

Finally there issues from extractor 5 an extract which comprises a mixture of n-propyl acetate, n-propyl alcohol, acetic acid and water. It is preferred that the extract before it goes to the rectifying column, contain an amount of water in excess of the amount necessary to remove all of the n-propyl acetate-n-propyl alcohol as an azeotrope.

This may be accomplished in several ways. One way is by using a solvent of n-propyl acetate-n-propyl alcohol that is rich in alcohol. As indicated above and as may be seen by reference to Figure 3, there is a decided favoring of the water content by the solvents richest in alcohol. The extract as it issues from the last extractor will contain sufficient water, if an alcohol rich solvent is employed.

Another way is to treat an extract containing too little water, with water and/or dilute acid for incorporating an excess water therewith. It is, of course, understood that the water or dilute acid will be added in an amount insufficient to dilute the acid content of the extract to the initial aqueous acid composition. The extract is then in condition for feeding into the rectifying column.

The extract whatever way obtained, is pumped to storage tank 9, thence to feed tank 10 and is metered into the extract vaporizer 11.

However, it is to be noted at this point, as will be set forth below, the extract may be fed into the column in a liquid condition.

The vapors issuing from vaporizer 11 are passed into the rectifying column 12 at some point near its central section. The n-propyl acetate and n-propyl alcohol with the amount of water necessary to form the above described ternary azeotrope are distilled from the top of the column, passing to the condenser 13 and then into the separator 15 where the distillate separates into layers. The watery layer flows to a solvent recovery system (not shown) and the solvent layer is returned to the storage tank 3 and may be reemployed in the extraction system.

As already indicated above, the solvent layer in its return passage may be treated to control its composition as by passage through an esterifier unit or in any of the other ways suggested.

Cold reflux is furnished to the column by condensing a portion of the vapors from the column 12 in the reflux condenser 14 and returning the liquid to the head of the column. This condenser may be replaced by a single tube or a multi-tube dephlegmator in the vapor line. Suitable devices, such as valves, may be inserted in this reflux branch, as in the conduit 81, for regulating the reflux. It is also possible to provide reflux for column 12 by conducting condensate from condenser 13 to the head of the column. One way of doing this would be to run a valved conduit from the pipe 34 to the head of column 12.

The acid and excess water are dropped to pot 29 then to still pot 16 which may be supplied with heat by steam in a calandria section or any other suitable manner. From this still pot 16 is distilled aqueous acetic acid of from 80% to 95% concentration which is collected in receivers 18 and 19.

This resulting acid may be used as obtained or it may be completely dehydrated in a number of different ways, among which may be mentioned the following: By azeotropically distilling the 80-95% acid with about just the right amount of n-propyl acetate, iso propyl acetate, or propylene chloride to remove the remaining water as an azeotrope, if anything keeping a very minute excess of water present. Or the process of azeotropic distillation described in the copending application No. 744,250 of September 15, 1934, by J. J. Gordon and C. C. Hyatt, Jr., may be employed. These processes have been referred to as examples, other agents and processes suitable for concentrating 80-95% may be employed. The azeotropic distillation methods described by us are particularly suitable and are considered as forming a novel combination with the present process of producing 80-95% acid.

There are a number of advantages in operating with an excess water in the extract as described. As for example in this manner it is certain, even when the process is being controlled by inexperienced operators, that the dehydrating agent will not contaminate the resulting concentrated acid. Large scale operators obtain dilute acid of various strength and from various sources. This acid can be partially concentrated to a more uniform product, which may be finally concentrated under controlled conditions. This provides a method in which expert control is required in removing only a small amount of water.

There are other processes that may be practiced in our apparatus setup disclosed in Fig. 5 and it may be stated at this point that it is also a feature of the present invention to so control the extraction and distillation that completely dehydrated acid not containing any of the dehydrating agent results from column 12.

In general, this may be done in the following ways. In all instances just about the right amount of agent is used. That is, there is employed at the start of the process, or at any other point or time in the process, just about enough agent of a suitable composition to remove all or nearly all the water as an azeotrope in the distillation step.

Should the water become in excess, a proper amount of agent may be added to the column, the separator, or the esterifier, to overcome this condition. On the other hand, if an excess of acetate-alcohol should build up in the system, sufficient water, as in the form of dilute acid, may be added to produce the preferred conditions, or, of course, some acetate-alcohol may be removed from the system. That there is an excess of agent in the system may be determined in several ways, for example, acetate-alcohol will appear in the concentrated acid that is tapped off, also a temperature rise in the system will occur.

Assuming that the process is in operation with n-propyl acetate-n-propyl-alcohol, the functioning of the column is as follows: Upon the top plate of column 12 there exists a ternary azeotrope of normal propyl acetate-normal-propyl alcohol-water. This constant boiling mixture is vaporized by the heat supplied to the column at 29 or some other suitable point, and part of this vaporous mixture passes over through the pipe 32 into the condenser 13 where it is condensed into a liquid mixture which then passes through the pipe 34 into the separator 15. The other part of the vaporous mixture is condensed and refluxed.

In this separator the water, being the heavier of the liquids, settles to the bottom and passes off therefrom by means of pipe 37 leading to the sewer or, if it is desired to recover some of the agent, to a solvent recovery system. The pipe 38 returns the normal-propyl acetate-normal propyl alcohol to an esterifier, if necessary, to control the composition. Or a portion of the agent may be returned a point lower in the column also for the purpose of controlling the entrainer composition as already described.

The process being in continuous operation, it is usually unnecessary to add further amounts of normal-propyl acetate-normal-propyl alcohol to the system. Any additions that are made would be used only to make up for the small amount of agent which may be lost in the system from slight leakage or by being carried off in some manner, such as by mechanical occlusion.

In either the first described process for producing 80-95% acid from column 12, or the second for producing anhydrous acid directly therefrom, it is possible that the processes be operated without the assistance of a vaporizer 11. Liquid extract may be continuously introduced through the pipe 51 at a rate equivalent to the capacity of the column 12 for dehydrating the extract. The lower portion of the column 12 will then perform substantially the same function as the vaporizers which may be used in processes of this type. However the vaporizer is important in that it does prevent the column from becoming contaminated with certain impurities. The acid refluxes into the still pot 29 where the excess accumulating is drawn off through the pipe 41 and may be conducted to still pot 16 for such treatment as may be desired.

If, instead of introducing the liquid extract by means of pipe 51, we are employing the vaporizer 11, the apparatus functions as follows: In the vaporizer 11 the extract is vaporized and the mixed vapors of water, agent and acid are conducted by means of pipe 48 into the column 12. The n-propyl acetate-n-propyl alcohol and water vapors together with some acid vapors travel up in the column and meet the downwardly progressing stream of normal propyl acetate-propyl alcohol being refluxed. The water combines with n-propyl acetate-n-propyl alcohol and forms a ternary azeotrope which distills off and passes in a vaporous state onto the next higher plate, and so on up the column; the acid passes down the column.

The pipe 48 may be provided with a suitable check-valve, in the event it may be desired to change from one mode of operation to the other at different times. As will be understood by those skilled in the art, the exact point in the column at which liquid or vaporous extract is introduced may be best determined by practice, since it is dependent on various factors, as the number of plates in the column, the agent being employed and the like.

It is, of course, possible to simultaneously introduce the extract in vapor form through the line 48, and in liquid form through the line 51.

From the foregoing description it is apparent that in our new processes the extraction step and distillation step are related. By the initial extraction and settling treatment a large amount of water is immediately eliminated thereby lightening the burden in the distillation step. By employing an agent with a suitable alcohol content for extracting, an extract is produced for distilling which may be caused to yield an 80-95% acid or, if desired, anhydrous acid. By condensing and treating the agent vaporized over in the distillation step a suitable agent for use in the extraction step is obtained, thereby rendering the process continuous and very efficient.

In the foregoing description we have directed the description to a large extent to the use of n-propyl acetate-n-propyl alcohol because we consider this agent very satisfactory.

In our investigation we have also determined that there are other new ester-alcohol agents to which the processes and apparatus described may be applied. For example, the following combinations may be mentioned: iso propyl acetate-iso propyl alcohol, propyl propionate-propyl alcohol, n-butyl actate-n-butyl alcohol, and iso butyl acetate-iso butyl alcohol. Generically then, our agent may be described as comprising an ester of an aliphatic acid and an aliphatic alcohol together with an aliphatic alcohol. The ester contains from five to six carbon atoms, and the alcohol contains from three to four carbon atoms.

The propyl propionate-propyl alcohol mixture is of particular value in the dehydration of propionic acid. Also the n-butyl acetate-n-butyl alcohol or iso-butyl acetate-iso butyl alcohol combinations are very useful in concentrating aqueous propionic acid or aqueous mixtures strong in propionic acid.

It is important to note that in the distillation step these ester-alcohol agents also carry over large amounts of water as indicated by the following examples:

| Agent | Azeotrope composition | B. P. of azeotrope |
| --- | --- | --- |
| n-Butyl acetate<br>n-Butyl alcohol | n-Butyl acetate 35.3%<br>n-Butyl alcohol 27.4%<br>Water 37.3% | 89.4° C. |
| Iso-butyl acetate<br>Iso-butyl alcohol | Iso-butyl acetate 46.5%<br>Iso-butyl alcohol 23.1%<br>Water 30.4% | 87.4° C. |

In employing these other agents in the processes and apparatus which have been described above in detail with respect to n-propyl acetate-n-propyl alcohol, of course due regard will be had for any differences in characteristics in the agents. That is, for example, n-butyl acetate-n-butyl alcohol yields a ternary azeotrope with water which boils at 89.4%. This is slightly higher than the boiling point of the azeotrope formed in the distillation step when n-propyl acetate-n-propyl alcohol is the agent. It is therefore, apparent due regard must be had for this temperature difference and higher temperatures employed.

However, it is clear, particularly in the treatment of aqueous propionic acid solutions, that an azeotrope boiling at 89.4° C. is sufficiently removed form the boiling point of the acid to be satisfactorily separated therefrom in the distillation step. The various features described in detail with respect to propyl acetate-propyl alcohol, such as for example controlling the agent's composition, and of producing either partially or completely dehydrated acid, apply to each of ester-alcohol combinations disclosed.

From the foregoing it will be further apparent that our processes may be carried out in many forms of apparatus of which Figs. 5, 6 and 7 are given for the purposes of illustration only. The invention might even be carried out with only an ordinary mixer, settling flask, distillation flask and condenser, although that would not be nearly as economical on a commercial scale. While in Fig. 7 a single column has been shown, it is to be understood that for other constructions it may be desirable to construct such a column in two or more sections placed one above or alongside of the other or in staggered relation. Other forms of apparatus and methods of carrying out the invention may be employed without departing from the spirit and scope thereof.

It will also be understood that the customary precautions for preventing heat losses by suitable insulation will be observed. The parts which contact with the acids are made out of materials suitable for that purpose, such as copper or copper alloys, iron silicon alloys, and stainless steel, such as the 18/8 variety containing about 18% chromium, 8% nickel, the balance being principally iron, for example. Parts that are subjected to heat will also be constructed of suitable heat-resisting materials. The process is preferably operated under atmospheric pressure conditions, although it can be conducted with the system at pressures either above or below atmospheric, the vent 149 which is shown on the extractor in Fig. 6 being provided for such purposes. When we refer to boiling points and the like, we refer to this data as being obtained under normal atmospheric conditions. Suitable meters and thermometers are to be employed where necessary.

The above disclosure shows that an acetate-alcohol extracting agent is highly efficient in the concentration of lower aliphatic acids (except formic) and including acetic, propionic, butyric and possibly others by extraction followed by distillation. We have found that the preferred process herein described is especially effective in the dehydration of aqueous acetic acid which may contain in some instances varying amounts of other aliphatic acids, as would be the case of pyroligneous liquor.

What we claim as our invention and desire to secure by Letters Patent of the United States is:

1. The process of concentrating an aqueous aliphatic acid which comprises extracting the aqueous acid with an agent comprising principally an aliphatic ester and an aliphatic alcohol, the ester having from five to six carbon atoms, the aliphatic alcohol containing three to four carbon atoms and recovering acid from the extract.

2. The process of dehydrating an aqueous aliphatic acid which comprises extracting the aqueous acid with an agent containing a predominating amount of propyl acetate and propyl alcohol, segregating the extract, and distilling therefrom a constant boiling mixture of propyl acetate, propyl alcohol and water at a temperature below the boiling point of water.

3. The process of dehydrating an aqueous aliphatic acid which comprises extracting the aqueous acid with normal propyl acetate and normal propyl alcohol, separating the extract, distilling a constant boiling mixture of normal propyl acetate, normal propyl alcohol and water from the extract, condensing the distillate, allowing at least a part of the distillate to settle into layers and returning the normal propyl acetate and normal propyl alcohol layer to the extraction step of the process.

4. The process of dehydrating an aqueous aliphatic acid which comprises extracting the aqueous acid with an agent comprising principally butyl acetate and butyl alcohol, recovering the extract and distilling water and agent therefrom.

5. The process of dehydrating aqueous acetic acid which comprises extracting the aqueous acid with normal propyl acetate and normal propyl alcohol, separating the extract and distilling normal propyl acetate, normal propyl alcohol and water therefrom.

6. The process of dehydrating aqueous propionic acid which comprises extracting the aqueous acid with propyl propionate and propyl alcohol, isolating the extract and distilling propyl propionate, propyl alcohol and water therefrom.

7. The process of partially concentrating an aqueous aliphatic acid which comprises extracting the aqueous acid with an agent comprising principally normal propyl acetate and normal propyl alcohol which has an alcohol content sufficient to insure the presence of more than enough water in the extract to remove all of the normal propyl acetate and normal propyl alcohol in the extract as a ternary azeotrope, segregating the extract and distilling therefrom the ternary azeotrope.

8. The process of partially concentrating aqueous aliphatic acids which comprises extracting the aqueous acids with normal propyl acetate and normal propyl alcohol, the propyl alcohol content being sufficient to yield an extract which has more than enough water relative to the amount of normal propyl acetate and normal propyl alcohol to insure its removal as an azeotrope, separating the extract, distilling a constant boiling azeotrope of normal propyl acetate, normal propyl alcohol and water from the extract, condensing the distillate and allowing at least a part of the distillate to separate into layers and returning the normal propyl acetate and normal propyl alcohol layer to the extraction step of the process.

9. In a process for the complete dehydration of aqueous aliphatic acids by extracting the aqueous acid with an agent comprising principally normal propyl acetate and normal propyl alcohol, separating and distilling the extract, the steps which comprise controlling the quantity and composition of the agent, the rate of supplying the extract for distillation and the manner of distillation so that there will be no excess of normal propyl acetate and normal propyl alcohol over its azeotropic ratio with the water in the distillation step and at the point in the distillation step at which substantially the last of the water is removed, the last of the normal propyl acetate and normal propyl alcohol will also be removed, thereby leaving an anhydrous acid uncontaminated by dehydrating agent.

10. The process for concentrating an aqueous aliphatic acid which comprises subjecting aqueous aliphatic acid to extraction with an esterifiable dehydrating agent, followed by azeotropic distillation of the extract, condensing the distillate, separation of the agent from the distillate, and subjecting the separated agent to an esterification treatment before returning it to the extraction step which converts a portion of said esterifiable dehydrating agent to an ester.

11. In the process for concentrating an aqueous aliphatic acid by an extraction and distillation treatment with a dehydrating agent comprising principally normal propyl acetate and normal propyl alcohol, condensation of the distillate and separation of the normal propyl acetate and normal propyl alcohol therefrom, the step of returning a part of the separated normal propyl acetate and normal propyl alcohol to the extraction step of the process and the other part of the separated normal propyl acetate and normal propyl alcohol to the distillation column at a point below the head of the column whereby the composition of the dehydrating agent is controlled.

12. The process of concentrating an aqueous aliphatic acid by the use of extractors and a distillation column which comprises extracting the aqueous acid with an agent containing a predominating amount of normal propyl acetate and normal propyl alcohol, isolating the extract, feeding the extract in the liquid state into the distillation column and recovering acid therefrom.

13. The process of dehydrating aqueous aliphatic acid which comprises extracting the aqueous acid with normal propyl acetate and normal propyl alcohol, separating the extract, distilling a constant boiling mixture of normal propyl acetate, normal propyl alcohol and water from the extract, condensing a part of the distillate and returning it as reflux to the extract mixture being distilled, condensing the other part of the distillate and allowing it to settle into layers whereby the normal propyl acetate and normal propyl alcohol layer may be returned to the extraction step of the process.

14. As a new chemical solvent for use in concentrating dilute aqueous aliphatic acids an agent comprising principally normal propyl acetate and normal propyl alcohol.

15. The process of dehydrating an aqueous aliphatic acid which comprises extracting the aqueous acid with an agent comprised principally of an aliphatic ester and an aliphatic alcohol, the ester having from 5 to 6 carbon atoms, the aliphatic alcohol containing 3 to 4 carbon atoms, recovering the extract, adding a source of water to the extract, and subjecting the resultant mixture to a distillation treatment.

16. The process of dehydrating an aqueous aliphatic acid which comprises extracting the aqueous acid with an agent comprised principally of an aliphatic ester and an aliphatic alcohol, the ester having from 5 to 6 carbon atoms, the aliphatic alcohol containing 3 to 4 carbon atoms, recovering the extract, adding dilute acetic acid to the extract, and subjecting the resultant mixture to a distillation treatment.

17. The process of dehydrating aqueous acetic acid solutions which comprises extracting the aqueous acid with butyl acetate and butyl alcohol, separating the extract, adding a source of water to the separated extract, and subjecting the resultant extract mixture to a distillation treatment.

18. The process of dehydrating aqueous acetic acid solutions which comprises extracting the aqueous acid with butyl acetate and butyl alcohol, separating the extract, adding dilute acetic acid to the separated extract, and subjecting the resultant extract mixture to a distillation treatment.

19. As a new chemical solvent for use in concentrating dilute aqueous aliphatic acids, an agent comprising about 3% to about 21% of propyl alcohol and the balance principally propyl acetate.

20. A chemical solvent for use in concentrating dilute aqueous aliphatic acids comprised principally of butyl acetate and butyl alcohol.

21. The process of dehydrating an aqueous aliphatic acid in a distillation column with an acetate and alcohol dehydrating agent which comprises extracting the aqueous acid with a dehydrating agent of an acetate mixed with its corresponding alcohol, separating the extract, passing the acid and water-containing extract into a distillation column, causing the acid and water in a vaporous condition to travel upwardly in the column and to contact the downwardly progressing acetate and alcohol agent, vaporizing a ternary azeotrope from the head of the column, rectifying an acid and water mixture in the base of the column, and withdrawing an acid free of acetate and alcohol from the base of the column.

22. The process of dehydrating an aqueous aliphatic acid in a distillation column with propyl acetate and propyl alcohol dehydrating agent which comprises extracting the aqueous acid with propyl acetate and propyl alcohol dehydrating agent, separating the extract, passing the acid and water-containing extract into a distillation column, causing the acid and water in a vaporous condition to travel upwardly in the column to contact the downwardly progressing propyl acetate and propyl alcohol agent, vaporizing a ternary azeotrope from the head of the column, rectifying an acid and water mixture in the base of the column, and withdrawing an acid free of propyl acetate and propyl alcohol from the base of the column.

23. The process of dehydrating an aqueous aliphatic acid in a distillation column with butyl acetate and butyl alcohol dehydrating agent which comprises extracting the aqueous acid with butyl acetate and butyl alcohol dehydrating agent, separating the extract, passing the acid and water-containing extract into a distillation column, causing the acid and water in a vaporous condition to travel upwardly in the column to contact the downwardly progressing butyl acetate and butyl alcohol agent, vaporizing a ternary azeotrope from the head of the column, rectifying an acid and water mixture in the base of the column, and withdrawing an acid free of butyl acetate and butyl alcohol from the base of the column.

24. In a process for concentrating aqueous acetic acid by extracting with an esterifiable dehydrating agent comprised principally of an acetate and its corresponding alcohol, followed by azeotropic distillation of the extract, condensation of the distillate, and separation of the acetate and alcohol agent from the distillate, the step of subjecting the separated acetate and alcohol agent to an esterification treatment which converts alcohol to acetate before returning it to the system for reuse.

25. In a process for concentrating aqueous acetic acid by extracting with an esterifiable dehydrating agent comprised principally of propyl acetate and propyl alcohol, followed by azeotropic distillation of the extract, condensation of the distillate, and separation of the propyl acetate and propyl alcohol agent from the distillate, the step of subjecting the separated propyl acetate and propyl alcohol agent to an esterification treatment which converts alcohol to acetate before returning it to the system for reuse.

26. In a process for concentrating aqueous acetic acid by extracting with an esterifiable dehydrating agent comprised principally of butyl acetate and butyl alcohol, followed by azeotropic distillation of the extract, condensation of the distillate, and separation of the butyl acetate and butyl alcohol agent from the distillate, the step of subjecting the separated butyl acetate and butyl alcohol agent to an esterification treatment which converts alcohol to acetate before returning it to the system for reuse.

27. The process for concentrating aqueous acetic acid solutions which comprises first concentrating up to about 80% to about 95% strength by extraction and distillation with an agent comprised principally of an acetate and its corresponding alcohol and having both solvent and entraining properties, and thereafter further concentrating the 80% to about 95% acid.

28. The process for concentrating aqueous acetic acid solutions which comprises first concentrating up to about 80% to about 95% strength by extraction and distillation with an agent comprised principally of propyl acetate and propyl alcohol and having both solvent and entraining properties, and thereafter further concentrating the 80% to about 95% acid.

29. The process of dehydrating aqueous aliphatic acid which comprises extracting the aqueous acid with butyl acetate and butyl alcohol, separating the extract, distilling a constant boiling mixture of butyl acetate, butyl alcohol and water from the extract, condensing a part of the distillate and returning it as reflux to the extract mixture being distilled, condensing the other part of the distillate and allowing it to settle into layers whereby the butyl acetate and butyl alcohol layer may be returned to the extraction step of the process.

JACK J. GORDON.
FREDERICK R. CONKLIN.